United States Patent
Wu et al.

(10) Patent No.: US 11,902,100 B2
(45) Date of Patent: Feb. 13, 2024

(54) DETERMINING AN ORGANIZATIONAL LEVEL NETWORK TOPOLOGY

(71) Applicant: Juniper Networks, Inc., Sunnyvale, CA (US)

(72) Inventors: Xiaoying Wu, Sunnyvale, CA (US); Sunalini Sankhavaram, Saratoga, CA (US); Abhiram Madhugiri Shamsundar, San Jose, CA (US); Kirti Vegad, Newark, CA (US); Huan Thien Vu, Los Angeles, CA (US); Rinoob Babu, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/930,367

(22) Filed: Sep. 7, 2022

(65) Prior Publication Data
US 2023/0231773 A1  Jul. 20, 2023

Related U.S. Application Data

(60) Provisional application No. 63/300,166, filed on Jan. 17, 2022.

(51) Int. Cl.
*H04L 41/12* (2022.01)
*H04L 41/22* (2022.01)
*H04L 9/40* (2022.01)

(52) U.S. Cl.
CPC ............ *H04L 41/12* (2013.01); *H04L 41/22* (2013.01); *H04L 63/029* (2013.01)

(58) Field of Classification Search
CPC ........ H04L 41/12; H04L 41/22; H04L 63/029
See application file for complete search history.

(56) References Cited

U.S. PATENT DOCUMENTS 7,624,167 B1 * 11/2009  Benjamin ............. H04L 41/044
                                                      709/202
9,729,439 B2   8/2017  MeLampy et al.
(Continued)

FOREIGN PATENT DOCUMENTS

EP    3937425 A1    1/2022
WO  2010011682 A1  1/2010

OTHER PUBLICATIONS

Estrin, Deborah, et al. Network visualization with the VINT network animator nam. tech. report 99-703, Computer Science Dept., Univ. Southern California, Los Angeles. (Year: 1999).*

(Continued)

*Primary Examiner* — John M MacIlwinen
(74) *Attorney, Agent, or Firm* — Shumaker & Sieffert, P.A.

(57) ABSTRACT

An example network analysis system includes a memory storing telemetry data received from a plurality of network devices, the plurality of network devices includes extract entity information and connectivity information from the received telemetry data, wherein the entity information represents one or more network devices of the plurality of network devices and the connectivity information represents network connections between one or more devices of the plurality of network devices; and store the connectivity information and entity information as a network topology graph in a graph database, wherein the entity information is stored as nodes of the network topology graph and the connectivity information is stored as edges of network topology graph, and wherein the network topology graph represents an organization level topology of the organization network.

17 Claims, 13 Drawing Sheets

(56) References Cited

U.S. PATENT DOCUMENTS

| | | | |
|---|---|---|---|
| 9,729,682 | B2 | 8/2017 | Kumar et al. |
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,290,129 | B2 * | 5/2019 | Madsen ................ H04L 41/12 |
| 10,432,522 | B2 | 10/2019 | Kaplan et al. |
| 10,693,739 | B1 | 6/2020 | Naseri et al. |
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 | 4/2021 | Rachamadugu et al. |
| 11,075,824 | B2 | 7/2021 | McCulley et al. |
| 2003/0009552 | A1 * | 1/2003 | Benfield ................ H04L 41/22 709/224 |
| 2006/0059125 | A1 | 3/2006 | Yan |
| 2007/0268294 | A1 * | 11/2007 | Eagen ................ H04L 41/22 345/474 |
| 2008/0298373 | A1 * | 12/2008 | Lapuh ................ H04L 12/4641 370/395.53 |
| 2016/0080502 | A1 | 3/2016 | Yadav et al. |
| 2016/0234099 | A1 * | 8/2016 | Jiao ................ H04L 47/2441 |
| 2016/0294642 | A1 | 10/2016 | Hopkins et al. |
| 2017/0083572 | A1 | 3/2017 | Tankersley et al. |
| 2017/0358111 | A1 | 12/2017 | Madsen |
| 2018/0121808 | A1 | 5/2018 | Ramakrishna et al. |
| 2018/0143891 | A1 * | 5/2018 | Polisetty ................ G06F 9/542 |
| 2018/0365336 | A1 * | 12/2018 | Raghavendra ........ H04L 43/045 |
| 2019/0104413 | A1 * | 4/2019 | Cidon ................ H04L 12/4625 |
| 2019/0280949 | A1 | 9/2019 | Wang et al. |
| 2020/0153697 | A1 * | 5/2020 | Turner ................ H04L 63/0823 |
| 2021/0306201 | A1 | 9/2021 | Wang et al. |
| 2021/0349977 | A1 * | 11/2021 | Kishikawa .......... H04W 12/122 |
| 2022/0182278 | A1 | 6/2022 | Vangapalli et al. |
| 2023/0016199 | A1 | 1/2023 | Jividen et al. |

OTHER PUBLICATIONS

Jiang, Jian, et al. "Constraint conditions to eliminate AS incentive of lying in interdomain routing." 2013 IFIP/IEEE International Symposium on Integrated Network Management (IM 2013). IEEE. (Year: 2013).*

Medeiros, João PS, and Selan R. Dos Santos. "RadialNet: An interactive network topology visualization tool with visual auditing support." Critical Information Infrastructure Security: Third International Workshop, CRITIS 2008. (Year: 2009).*

U.S. Appl. No. 17/304,723, filed Jun. 24, 2021, naming inventors Wang et al.

U.S. Appl. No. 17/647,954, filed Jan. 13, 2022, naming inventors Jisheng Wang et al.

U.S. Appl. No. 63/300, 166, filed Jan. 17, 2022, naming inventors Wu et al.

"802.1AB-REV—Station and Media Access Control Connectivity Discovery," https://www.ieee802.org/1/pages/802.1AB-rev.html, Last Modified on Jun. 30, 2009, 4 pp.

"ArangoGraph Insights Platform," retrieved from https://www.arangodb.com/ on Jul. 18, 2023, 4 pp.

Extended Search Report from counterpart European Application No. 22215693.7 dated Jun. 16, 2023, 9 pp.

U.S. Appl. No. 17/935,704, filed Sep. 27, 2022, by Wang et al.

* cited by examiner

DETERMINING AN ORGANIZATIONAL LEVEL NETWORK TOPOLOGY

RELATED APPLICATION

This application claims the benefit of U.S. Provisional Application No. 63/300,166, filed Jan. 17, 2022, the entire contents of which are incorporated herein by reference.

FIELD

The disclosure relates generally to computer networks and, more specifically, to determining a topology for an organization's network and visualizing the network topology.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and organizations (e.g., enterprises) may have networks that include multiple layers of gateways, routers, switches, and access points. Further, organizations and network providers may use software-defined networking in a wide area network (SD-WAN) to manage network connectivity among distributed locations (e.g., sites), such as remote branch or central offices or data centers. SD-WAN extends SDN to enable businesses to create connections quickly and efficiently over the WAN, which may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

SUMMARY

In general, this disclosure describes techniques for determining a topology of an organization's network. As noted above, an organization may have a network that is distributed across multiple geographical sites, and each site can have multiple layers of network devices, including, for example, gateways, routers, switches, and access points. As the number of network devices within an organization grows so does the complexity in storing and managing all of the connections. In addition, the topology of a given organization's network may be continuously changing, particularly when logical links or paths are used to connect devices. The topology may also be continuously changing due to the frequent association and disassociation of wireless clients with access points. It can be helpful for a network management system to know the full topology of an organization's network in order to perform troubleshooting and root cause analysis. It is also useful for customers to be able to view the full topologies of their organization's network across multiple sites in order to participate in troubleshooting and remediation within the network.

In some aspects of the disclosure, network devices in an organization's network can periodically send telemetry data to a network analysis system. The network analysis system can receive various forms of telemetry data from the network devices, and from such telemetry data, can determine an organization's network topology. The network analysis system can generate a network topology graph from the telemetry data received from the network devices. In some aspects, the network topology graph can reflect both current connectivity and connection properties and past connectivity and connection properties, and may be referred to as a temporal network topology graph.

The techniques disclosed herein may be included in a practical application that provides technical advantages over existing systems. For example, a technical problem in existing systems for determining and/or visualizing a network topology is that they may be limited to providing a site-level view of a network topology, and generally do not provide a full view of an organization's network. Another technical problem with existing systems is that they may rely on customers and/or operators to input substantial amounts of information regarding their network's topology. A further technical problem is that existing systems typically cannot provide historical views of past versions of a network topology.

A technical advantage of the techniques disclosed herein may include that an application, such as a network analysis system, can automatically obtain telemetry information from devices on an organization's network and generate a network topology from the telemetry information without requiring substantial user input. A further technical advantage of the techniques disclosed herein may include that they can provide a comprehensive view of an organization's network topology across multiple sites. Another technical advantage of the techniques disclosed herein may include that the network topology graph generated using the techniques can represent both current and past connectivity and properties of an organization's network. For example, in some implementations, a temporal network topology graph can represent thirty days of network connectivity and network property data.

In one example, this disclosure describes a network analysis system that includes a memory storing telemetry data received from a plurality of network devices, the plurality of network devices includes extract entity information and connectivity information from the received telemetry data, wherein the entity information represents one or more network devices of the plurality of network devices and the connectivity information represents network connections between one or more devices of the plurality of network devices; and store the connectivity information and entity information as a network topology graph in a graph database, wherein the entity information is stored as nodes of the network topology graph and the connectivity information is stored as edges of network topology graph, and wherein the network topology graph represents an organization level topology of the organization network.

In another example, this disclosure describes a method that includes receiving, by one or more processors, telemetry data from a plurality of network devices, the plurality of network devices comprising an organization network having two or more sites, the plurality of network devices configured to provide at least one wireless network at each site; and extracting entity information and connectivity information from the received telemetry data, wherein the entity information represents one or more network devices of the plurality of network devices and the connectivity information represents network connections between one or more devices of the plurality of network devices; and storing the connectivity information and entity information as a network topology graph in a graph database, wherein the entity information is stored as nodes of the network topology graph and the connectivity information is stored as edges of network topology graph, and wherein the network topology graph represents an organization level topology of the organization network.

In another example, this disclosure describes a computer-readable medium having instructions stored thereon that when executed, cause one or more processors to: receive telemetry data from a plurality of network devices, the plurality of network devices comprising an organization network having two or more sites, the plurality of network devices configured to provide at least one wireless network at each site; and extract entity information and connectivity information from the received telemetry data, wherein the entity information represents one or more network devices of the plurality of network devices and the connectivity information represents network connections between one or more devices of the plurality of network devices; and store the connectivity information and entity information as a network topology graph in a graph database, wherein the entity information is stored as nodes of the network topology graph and the connectivity information is stored as edges of network topology graph, and wherein the network topology graph represents an organization level topology of the organization network.

The details of one or more examples are set forth in the accompanying drawings and the description below. Other features, objects, and advantages will be apparent from the description and drawings, and from the claims.

DETAILED DESCRIPTION

Techniques described herein may include automated discovery of a network topology based on telemetry data received by a network analysis system or network management system from network devices. The automated discovery of the network topology can include the determination of site hierarchies. In addition, some techniques may include automated discovery of third-party network devices within the topology and virtual links/paths between the devices in the topology.

Figure 1:
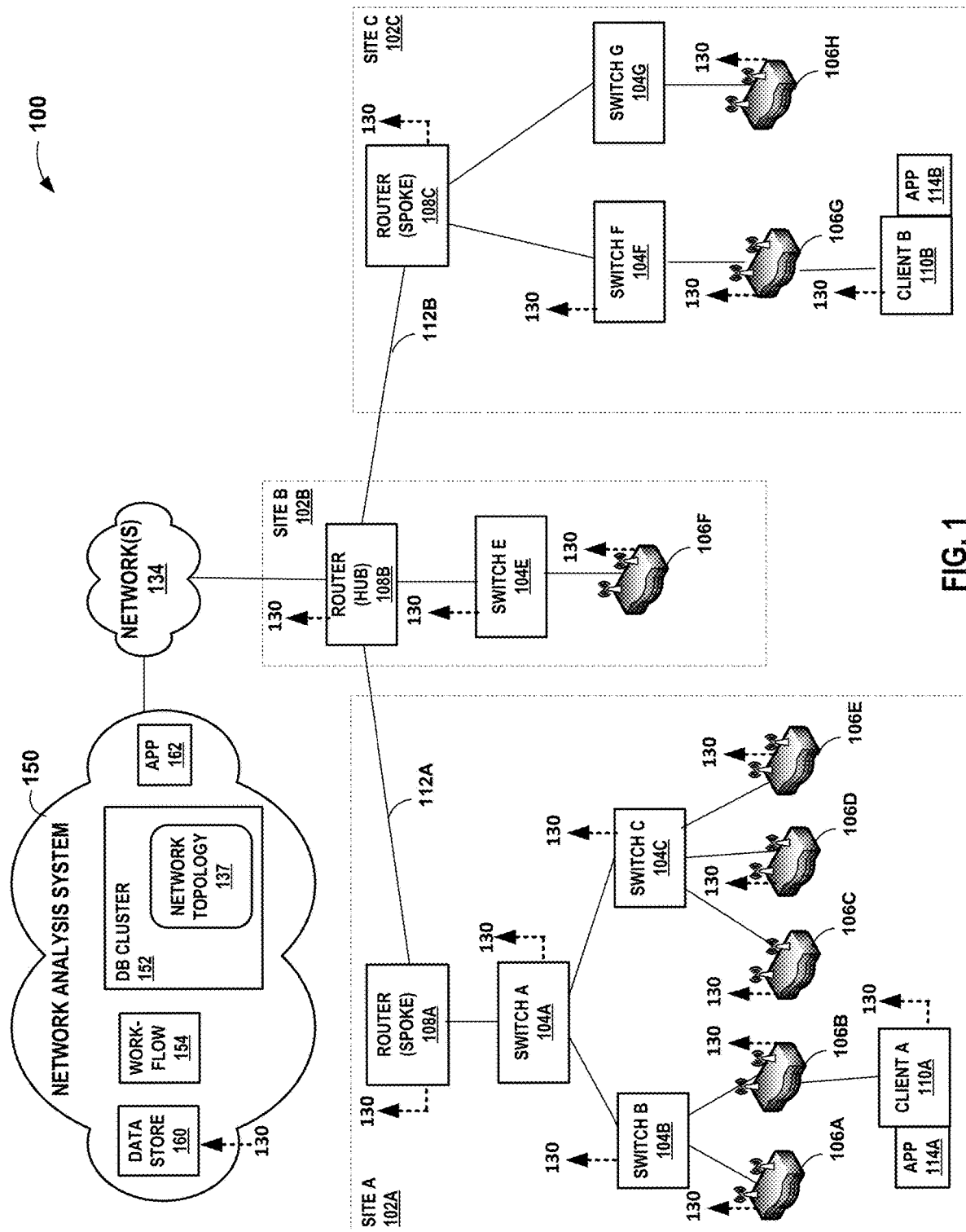
FIG. 1 is a block diagram of an example network system, in accordance with one or more techniques of the disclosure.

FIG. 1 is a block diagram of an example network system in which a network analysis system 150 receives telemetry data from network devices and clients in the network and uses the telemetry data to create and maintain a temporal network topology graph for an organization's network. In the example shown in FIG. 1, an organization includes three sites 102A-102C arranged in a "hub and spoke" architecture, with site 102B being the hub site and sites 102A and 102C being spoke sites. As an example, the organization may be a large corporation with multiple campuses, where each campus may be a site. Generally speaking, a site may refer to a geographic location. The organization may have sites in different cities, sites that are different campuses within a city, sites that are different buildings within a campus, etc.

Network system 100 also includes switches 104A-104F (collectively "switches 104") and access points (APs) 106A-106H. Each AP 106 may be any type of wireless access point, including, but not limited to, a commercial or organization AP, a router, or any other device capable of providing wireless network access. In some examples, network topologies other than hub and spoke may be used. For example, the network may be a partial mesh topology, a full mesh topology, or other network topology. Further, the network topology may be a hybrid topology. For example, the hubs and sites may be arranged in a hub and spoke topology while internal to a site, the network may have a mesh topology.

Site 102B includes router 108B which is configured as a hub router. Router 108B is configured to communicate with spoke router 108A at site 102A via wide area network (WAN) link 112A. Router 108B is configured to communicate with spoke router 108C at site 102C via WAN link 112B. Further, router 108B is configured to communicate with network 134. In some aspects, network 134 may be one or networks of an organization intranet. In some aspects, network 134 may be the Internet. Router 108B is also configured to communicate with switch 104E, which is configured to communicate with access point 106F.

In addition to router 108A, site 102A includes switch 104A that is communicatively coupled to switches 104B and 104C. Switch 104B is communicatively coupled to access points 106A and 106B. Switch 104C is communicatively coupled to access points 106C-106E.

In addition to router 108C, site 102C includes switches 104F and 104G. Switch 104F is communicatively coupled to access points 106G and 106H.

Client 110A is communicatively coupled to access point 106B and client 110B is communicatively coupled to access point 106G. Clients 110A and 110B can be any type of wireless client device, including, but not limited to, a mobile device such as a smart phone, tablet or laptop computer, a personal digital assistant (PDA), a wireless terminal, a smart watch, smart ring or other wearable device. Clients 110A and 110B may also be IoT client devices such as printers, security devices, environmental sensors, or any other device configured to communicate over one or more wireless networks. In the example illustrated in FIG. 1, application 114A executing on client 110A communicates with application 114B executing on client 110B. As an example, applications 110A and 110B may be videoconferencing applications, video telephony applications, Voice over Internet Protocol (VoIP) applications, multiplayer gaming applications and the like.

During operation, devices in network system 100 may collect and communicate telemetry information 130 to network analysis system 150. Telemetry information 130 may vary depending on the type of device providing the information and whether or not the device is configured to provide telemetry information.

In some aspects, AP 106 may provide AP telemetry data that includes information regarding AP connectivity to other network devices. For example, the AP telemetry data may include data identifying the number of clients connected to the AP and a switch connected to the AP. In some aspects, an AP 106 may provide Link Layer Discovery Protocol (LLDP) data as part of telemetry data 130. Link Layer Discovery Protocol (LLDP) is a layer 2 neighbor discovery protocol that allows devices to advertise device information to their directly connected peers/neighbors. An AP 106 may provide LLDP data to identify a wired connection to a switch. AP 106 may also report information on client devices connected to the AP. In some aspects, NAS 150 may treat information about clients received from an AP as a separate source from the AP, e.g., NAS 150 treats the client information as if it came from the client device rather than the AP device. Clients and client connectivity data have relatively high volume compared to other entities in the graph. In some aspects, an AP may periodically report telemetry data to NAS 150 (e.g., every minute).

Similarly, a switch 104 may provide AP telemetry regarding connectivity to an AP 106. Switches 104 may also provide switch telemetry information regarding connectivity to other switches, routers, gateways etc. In some aspects, switches 104 may provide LLDP data identifying the switch reporting the LLDP data and identifying devices connected to ports of the switch and the types of ports.

Other devices such as routers and gateways may also provide telemetry information such as LLDP data. Additionally, gateway devices (e.g., routers 108) may report both wired connections and virtual or logical connections. A given network device may establish multiple logical paths (e.g., peer paths or tunnels) over a WAN with multiple other network devices on a single physical interface. Each of the network devices may include a software agent or other module configured to report path data collected at a logical path level to NAS 150 in the cloud and/or the path data may be retrieved from the network devices by NAS 150 via an application programming interface (API) or protocol. In some aspects, the telemetry data may include labels identifying the network device as a hub or data center router. In some aspects, the telemetry data may identify the router as a spoke router (e.g., a branch office router).

In examples where routers 108 include session-based routers, a given session-based router may establish multiple peer paths over the WAN with multiple other session-based routers on a single physical interface. Each of the session-based routers may include a software agent imbedded in the session-based router configured to report the path data collected at a peer path level to the NMS in the cloud. In examples where the network devices comprise packet-based routers, a given packet-based router may establish multiple tunnels over the WAN with multiple other packet-based routers on a single physical interface. Each of the packet-based routers may collect data at a tunnel level, and the tunnel data may include the tunnel data as part of telemetry data reported to NAS 150.

Gateway devices may also report network session data such as session flow data. Session flow data can include source and destination client IP addresses and session duration for a network session between two network devices.

In the example of FIG. 1, network analysis system (NAS) 150 can receive the telemetry data and can process the telemetry data to create and maintain network topology 137. In this example, NAS 150 can be a cloud-based computing platform that implements various techniques of the disclosure. In accordance with the techniques described herein, NAS 150 may monitor telemetry data received from the various devices of network system 100, and may store the received data in data store 160. Workflow 154 can periodically process the telemetry data store in data store 160 to create network topology 137. In some aspects, network topology 137 may be stored in database cluster 152. Network topology 137 can represent network connectivity in network system 100. In some aspects, network topology 137 is a temporal network topology that can represent current and past network connectivity and can also capture changes in properties of network connections. In some aspects, database cluster 152 is adapted for storing and retrieving graph data (e.g., a graph database). As an example, database cluster 152 may be an ArangoDB™ database cluster available from ArangoDB, Inc. of San Francisco, California In some examples, database cluster 152 may be another type of database, e.g., a relational database having rows and columns that define nodes and edges of a graph. Once created, network topology 137 may be used by other applications, for example, application 162. Application 162 may be a network analysis application, a network management application, a network reporting application, a network visualization application, a network troubleshooting application and the like.

In some implementations, some or all of routers 108, switches 104, and APs 106 may be from the same manufacturer, or may provide telemetry data 130 that conforms to a format or protocol that is known to NAS 150. However, it may be the case that some network devices in network system 100 do not provide telemetry data 130, or do not provide data according to format or protocol known to NAS 150. Such network devices may be referred to as third-party network devices. For instance, in the example illustrated in FIG. 1, switch 104G does not provide telemetry data 130 to NAS 150 and is thus a third-party network device. In such cases, NAS 150 can use techniques described herein to infer the existence of devices like switch 104G that do not provide telemetry data 130. In the example of FIG. 1, AP 106H is connected to third-party switch 104G and does report telemetry data 130. Additionally, router 108C is connected to third-party switch 104G and reports telemetry data 130. NAS 150 may use telemetry data from router 108C and/or AP 106H to infer the existence of switch 104G and connection properties of switch 104G even though switch 104G itself may not report such information.

In some aspects, database cluster 152 may include a document collection and an edge collection. The document collection can include various entities in network system 100. For example, device entities in the document collection can include routers, switches, gateways, and other devices connected via a wired connection. A client entity in the device collection can include mobile clients. An application entity in the device collection can include applications for which information has been extracted from session flow data. For example, the SRX series of routers available from Juniper Networks, Inc. may include application session data as SRX flows. Smart Session Routers (SSRs) also available from Juniper Networks, Inc. may also include application session data as SSR session data. Other routers can provide application session data. The edge collection can include connectivity data between entities in the document collection. In some aspects, an edge in the edge collection includes "connectedTo" field, a "clientConnectedTo" field, and a "wanConnectedTo" field. The connectedTo field describes wired device connectivity information, and may indicated whether the connection is an uplink connection. The clientConnectedTo field describes the device or client that an application entity is running on. The wanConnectedTo field describes peer paths and/or IPsec tunnels from routing devices.

Although some of the techniques of the present disclosure are described in this example as performed by NAS 150, it shall be understood that techniques described herein may be performed by any other computing device(s), system(s), and/or server(s), and that the disclosure is not limited in this respect. For example, one or more computing device(s) configured to execute the functionality of the techniques of the disclosure may reside in a dedicated server or be included in any other server (not shown in FIG. 1) in addition to or other than NAS 150, or may be distributed throughout network system 100, and may or may not form a part of NAS 150.

FIG. 1 has shown an example network system 100 having three sites. A network system may have fewer or more sites than those illustrated in FIG. 1. Additionally, sites may have a fewer or greater number network devices such as switches 104 and APs 106 than shown in FIG. 1.

Figure 2:
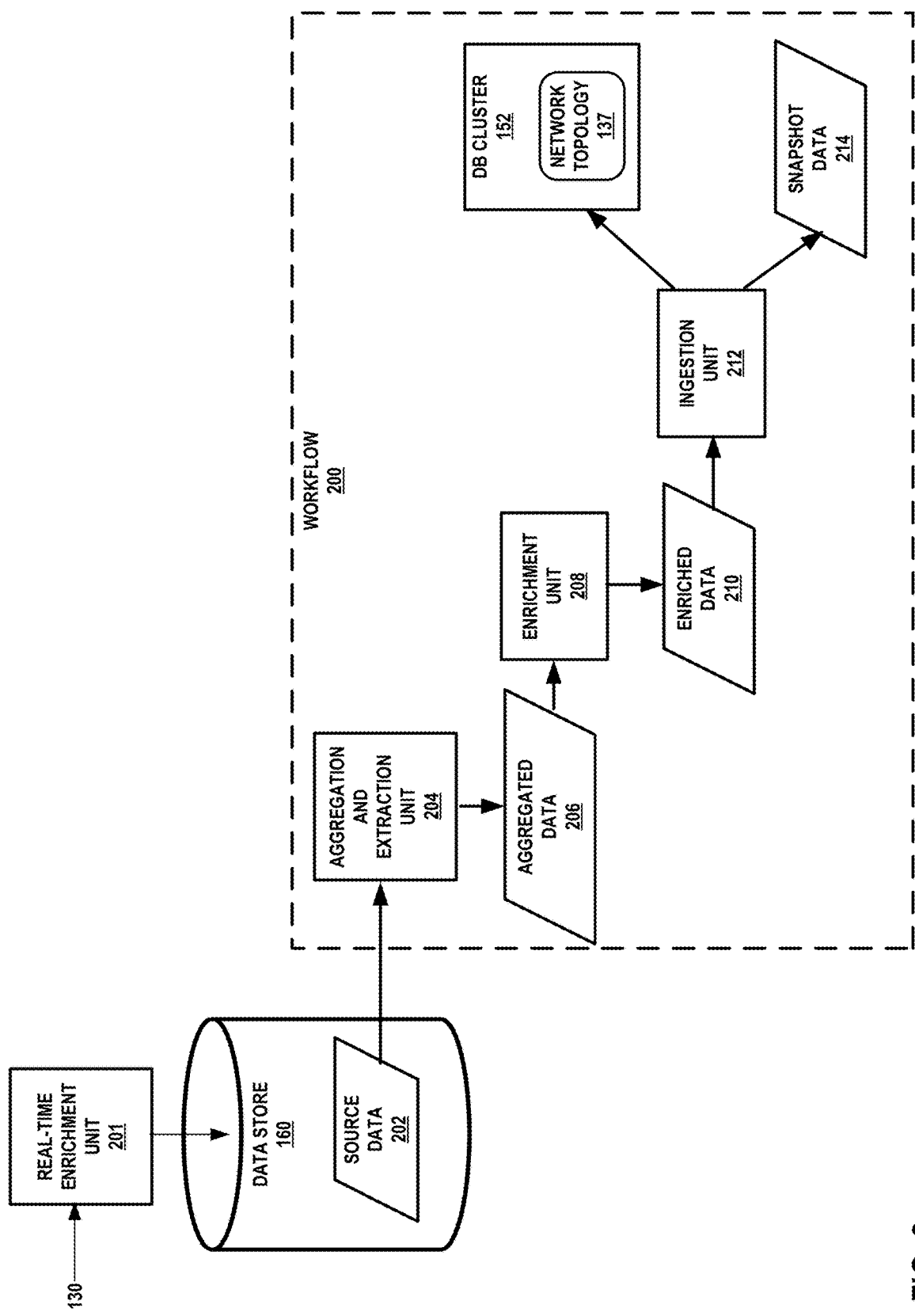
FIG. 2 is a conceptual diagram of a work flow, in accordance with one or more techniques of the disclosure.

FIG. 2 is a conceptual diagram of an example work flow, in accordance with one or more techniques of the disclosure. Workflow 200 may be an implementation of workflow 154 of FIG. 1. In the example illustrated in FIG. 2, workflow 200 includes aggregation and extraction unit 204, enrichment unit 208, and ingestion unit 212. In some aspects, workflow 200 is executed on a periodic basis to process source data 202. For example, workflow 200 may be executed on an hourly basis.

As discussed above, telemetry data 130 can be stored in data store 160. In some aspects, prior to storing telemetry data 130, real-time enrichment unit 201 processes telemetry data to produce source data 202. For instance, real-time enrichment unit 201 may correlate application session data obtained via SFLOW or session flow records with particular clients. As an example, a user may initiate a video call session from a conference room while their mobile client device is associated with a first AP. The IP address associated with the session will typically be the IP address assigned to the client device by the first AP. Later, the user may move to their office, resulting in the mobile client device disassociating from the first AP and establishing a new association with a second AP, resulting in the mobile client being assigned a different IP address. The user may initiate a second video call session from their office. In this situation, session flows for the two video calls may have different IP addresses, even though the session flows are associated with the same mobile client device. Real-time enrichment unit 201 may correlate the two IP addresses to the Media Access Control (MAC) address of the mobile client and associate the session flows using the MAC address so that the session flows can be associated with the proper mobile client device. In some aspects, real-time enrichment unit 201 correlates the IP addresses in session flow records with MAC address-to-IP address mappings obtained from telemetry data provided by APs.

In some aspects, real-time enrichment unit 201 may be implemented using Apache Storm™. Apache Storm™ is a distributed stream processing architecture and is available from the URL "storm.apache.org."

Aggregation and extraction unit 204 obtains source data 202 (e.g., from data store 160). Aggregation and extraction unit 204 aggregates the data, and performs de-duplication operations on temporal properties of the data. In some aspects, aggregation and extraction unit 204 analyzes source data 202 to determine network devices that reported telemetry data. Additionally, aggregation and extraction unit 204 analyzes source data 202 to determine network devices that were reported as being connected to other network devices. Aggregation unit 204 generates aggregated data 206 as output. This may result in duplicate network devices being detected. Aggregation and extraction unit 206 determines those duplicate network devices that are not to be included in aggregated data 206.

Enrichment unit 208 receives aggregated data 206 as input, and can add information when information in aggregated data 206 is missing or incomplete. As an example, LLDP records may be included in telemetry data 130 that are incomplete. Enrichment unit 208 can obtain information from the entity collection and use such information to fill in missing or incomplete fields in the LLDP records. Additionally, enrichment unit 208 can identify third-party device that are not configured to provide telemetry information 130. For example, aggregated data 206 may include network devices that did not report telemetry data, but were identified as being connected to network devices that did report telemetry data. Enrichment unit 208 can obtain information for such third-party devices. Additionally, enrichment unit 208 can identify unassigned or disconnected devices. An unassigned device is a device that is claimed by an organization, but not assigned to any site. A disconnected device is a device assigned to a site that is not currently providing telemetry data.

Further, enrichment unit 208 can determine information about switch ports, including identifying which port of the switch is an uplink port. Determination of the uplink port in a switch can be desirable to automatically determine where the switch is positioned in a multi-level network device hierarchy. An uplink port may be connected to a parent switch or router, and other ports will be connected to child network devices. Example details on techniques for determining an uplink port of a switch (or router) are found in U.S. patent application Ser. No. 17/304,723 entitled "NETWORK PORT CHARACTERIZATION," and filed on Jun. 24, 2021, the entire contents of which are herein incorporated by reference.

Enrichment unit 208 may also identify routers and switches as hubs and/or spokes. For example, a switch having an uplink port to another switch or router may be identified as a spoke switch. A switch or router that is not connected to an AP device and/or does not have an uplink connection may be identified as a hub or data center router.

Enrichment unit 208 may generate enriched data 210 as output. Ingestion unit 212 may receive enriched data 210 as input, and may generate network topology 137 based on the enriched data 210. For example, ingestion unit 212 can analyze the enriched data 210 to determine connectivity between entities and connection properties. Based on the connectivity and connection properties, ingestion unit 212 can create network topology 137. Ingestion unit 212 can store network topology 137 in database cluster 152. In some aspects, ingestion unit 212 can also generate snapshot data 214. Snapshot data 214 can be the most recently stored version of the network topology. In some aspects, ingestion unit 212 generates a new version of network topology 137, and compares the new version of network topology 137 with snapshot data 214 to determine changes, which may be also referred to herein as "deltas," in the network topology. In some aspects, rather than updating database cluster 152 with the complete new version of the network topology, ingestion unit 212 may store the deltas (e.g., changed data). After determining and storing the deltas, ingestion unit may replace snapshot data 214 with the new version of the network topology. In addition to begin used to determine deltas, snapshot data 214 may be used for debugging and testing software.

In some aspects, aggregation and extraction unit 204, enrichment unit 208, and ingestion unit 212 may be implemented using Apache Spark™ and orchestrated using Apache Airflow™. Versions of Apache Spark™ and Apache Airflow™ are available at the uniform resource locators (URLs) "spark.apache.org" and "airflow.apache.org" respectively. Additionally, real-time enrichment unit 201, aggregation and extraction unit 204, enrichment unit 208, and ingestion unit 212 may communicate with one another using a software message bus such as Apache Kafka® available from the URL "kafka.apache.org."

Figure 3:
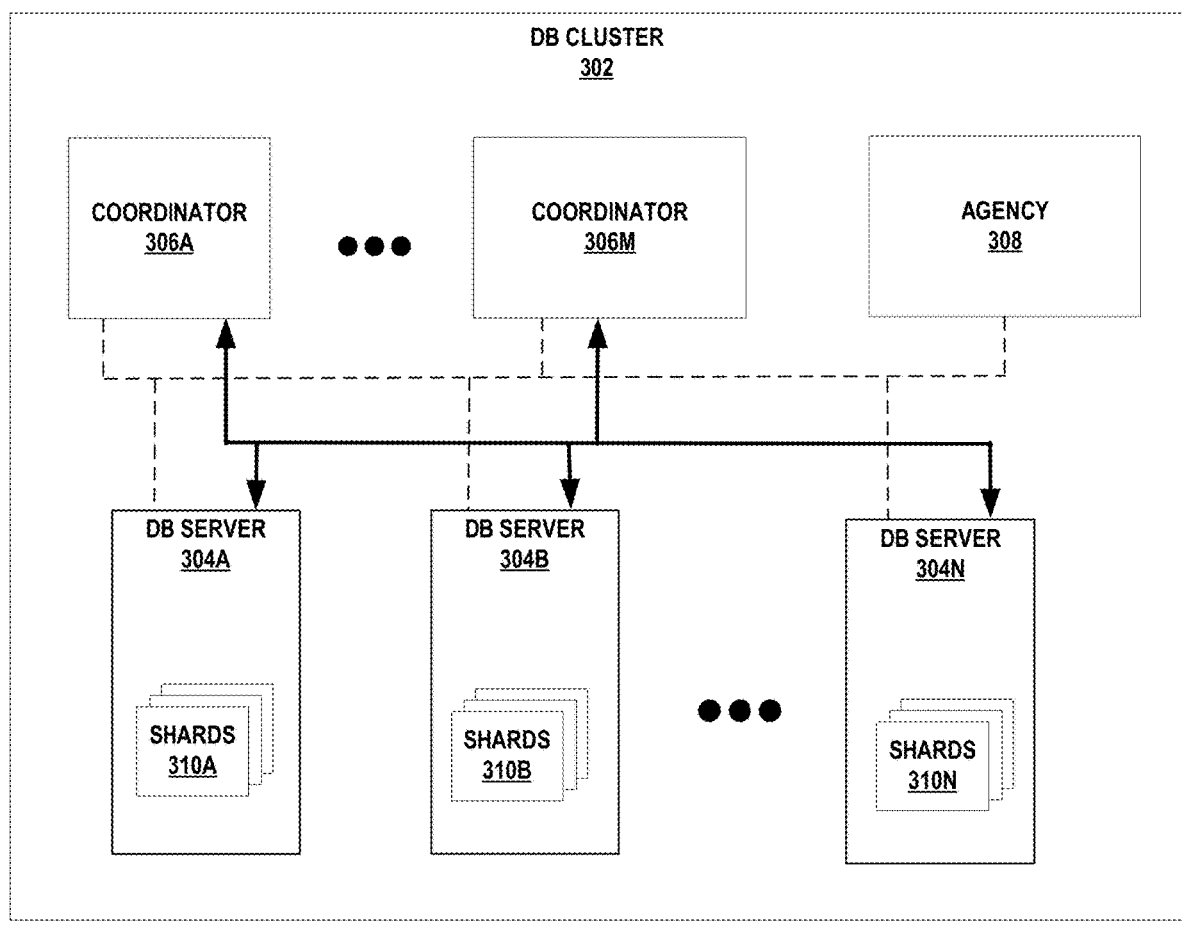
FIG. 3 is a block diagram of a database cluster architecture, in accordance with one or more techniques of the disclosure.

FIG. 3 is a block diagram of a database cluster architecture, in accordance with one or more techniques of the disclosure. In the example shown in FIG. 3, database cluster 302 may be an implementation of database cluster 152 of FIG. 1. In some aspects, database cluster 302 includes database servers 304A-304N (collectively "database servers 304"), coordinators 306A-306M (collectively "coordinators 306"), and agency 308. Coordinators 306 interact with clients such as ingestion unit 212 (FIG. 2) and coordinate cluster tasks such as queries and insertion functions. Agency 308 stores the configuration for database cluster 302 and can provide synchronization services for the cluster. Database servers 304 store graph data, e.g., network topology 137. In some aspects, database servers 304 store the graph data as shards 310.

Figure 4:
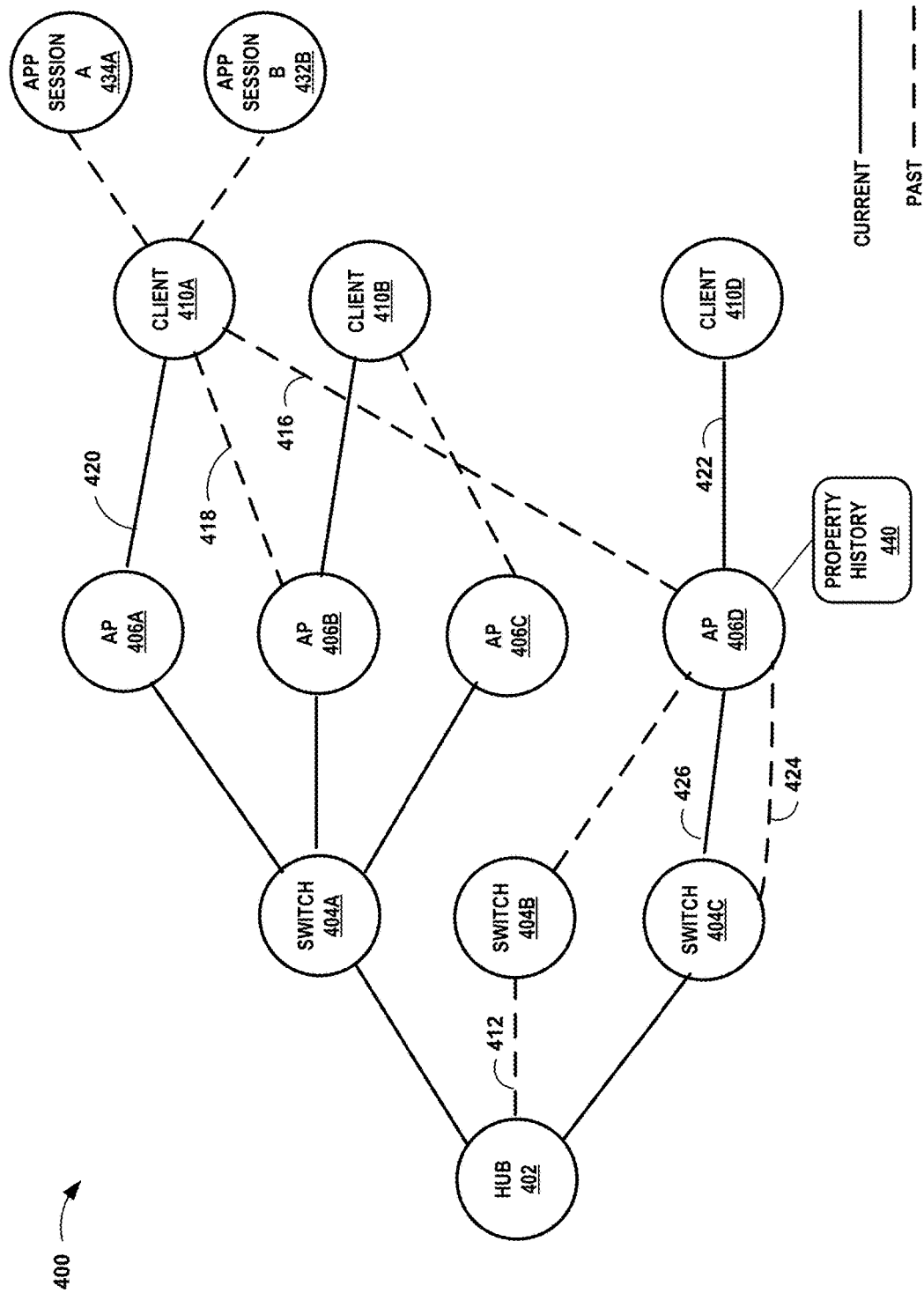
FIG. 4 is a conceptual diagram of an example temporal graph, in accordance with one or more techniques of the disclosure.

FIG. 4 is a conceptual diagram of an example temporal network topology graph, in accordance with one or more techniques of the disclosure. As noted above, a temporal network topology graph represents current network connectivity properties and past network connectivity properties, and can thus represent a history of network property changes over time. In the example illustrated in FIG. 4, temporal network topology graph 400 represents a network including hub 402, switches 404A-404C, APs 406A-406D, and clients 410A-410D, each of which are represented as nodes in the graph. In addition, temporal network topology graph 400 can include nodes representing application sessions 434A and 434B. Edges in the graph represent network connectivity properties between nodes. Edges shown as solid lines represent current network connectivity properties, while edges shown as dashed lines represent past network connectivity properties. Current network properties can include connections that currently exist and properties that are currently in effect with respect to connections and network devices. Past network properties can be connections that no long exist, and properties that are no longer in effect for the connections and network devices. For instance, edge 414 indicates that hub 402 is currently connected to switch 404C.

Edge 412 indicates that hub 402 was connected to switch 404B, but is no longer connected. As an example, a network operator may replace switch 404B with switch 404C. At the time of replacement, edge 414 is created between hub 402 and switch 404C, and edge 412 is marked as expired. Edges 424 and 426 represent a property change in the connection between switch 404C and AP 406D. For example, a maximum bandwidth parameter for the link between switch 404C and AP 406D may be changed. In this example, edge 424 represents the old connection properties while edge 426 represents the new connection properties.

An expired edge may be removed from the graph based on a time-to-live (TTL) value. When an edge is marked as expired, a TTL value may be assigned. The TTL value may be set to match other history data maintained by a troubleshooting application. In some implementations, the TTL value may be thirty days. Other TTL values may be used in other implementations that are longer than, or shorter than thirty days. When the TTL value, the edge can be removed from the temporal network graph. As an example, assume that client 410A first connected to the network via AP 406C. Later, client 410A disassociates from AP 406C and associates with AP 406B. Still later, client 410A disassociates from AP 406B and associates with AP 406A. In this example, edge 420 represents the current network connection between client 410A and AP 406A. Edges 418 and 416 represent the past connections between client 410A and APs 406C and 406B respectively. The TTL value for edge 416 may be less (i.e., a shorter duration) than the TTL value for edge 418 as it represents an older past connection. Edge 422 represents a network connection between AP 406D and client 410D. There are no past connections associated with client 410D. This may be because AP 406D is the first AP in the network to which client 410D associated with, or it may be because client 410D associated with other APs (e.g., one or more of APs 406A-206C), but disassociated with the other APs at a time that is far enough in the past for the edges to have been removed due to TTL expiration.

In addition to connectivity properties, network analysis system 150 may maintain property history 440 for nodes in temporal network topology graph 400 Property history may be maintained for network device names and IP addresses for an entity such as a network device. For example, network analysis system 150 may keep a history of IP address changes associated with a node. Some changes to a network device cause a new node created and are not included in property history 440. For example, a MAC address change can cause a new node to be created in temporal network topology graph 400.

Figure 5A:
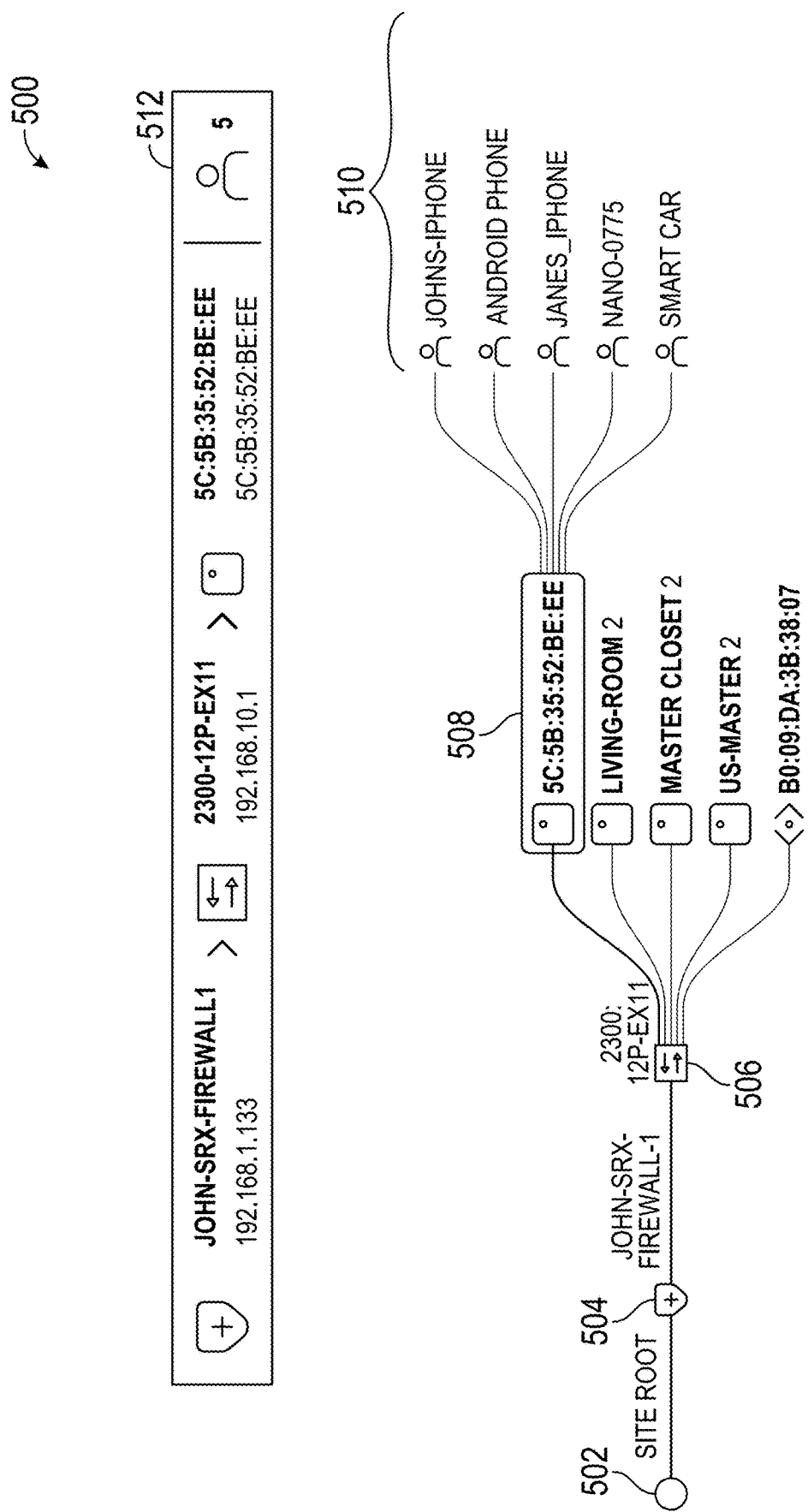
FIGS. 5A and 5B are conceptual diagrams of example visualizations of a network topology graph, in accordance with one or more techniques of the disclosure.
Figure 5B:
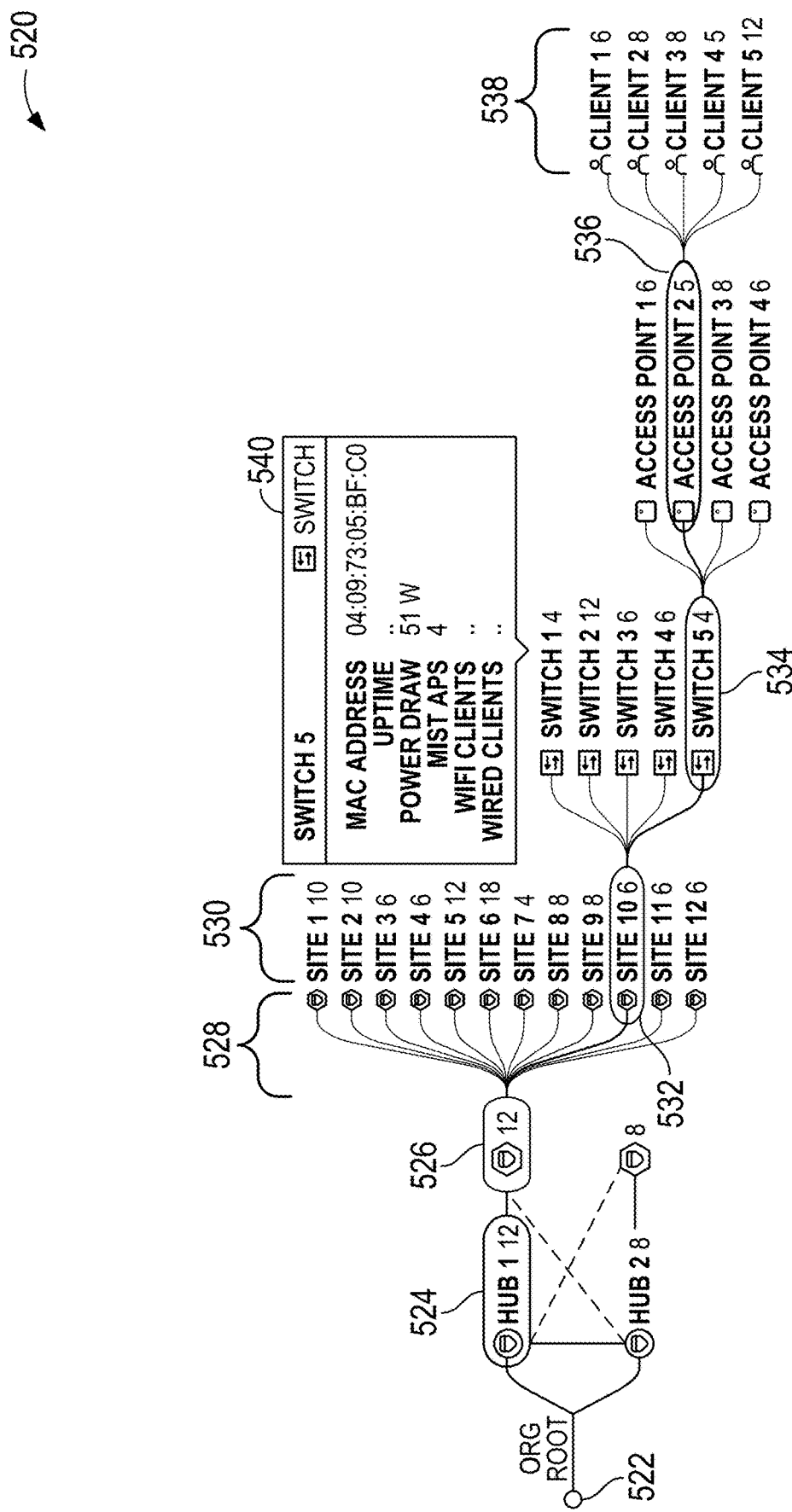

FIGS. 5A and 5B are conceptual diagrams of example visualizations of a network topology graph, in accordance with one or more techniques of the disclosure. In some aspects, an organization's network topology can be viewed at various levels. FIG. 5A is a conceptual diagram of an example visualization of an organization's network topology graph at a site level. Visualization 500 shows a hierarchy of network devices, where site 502 is the root of the network topology graph. Next in the hierarchy is an icon 504 represent a firewall device in the site network. At the next level, an icon 506 represents a switch in the network topology that is connected to the firewall. At the next level, icons representing access points are shown. In the example shown in FIG. 5A, icon 508 representing access point "5c:5b:34:52:be:ee" has been selected. In response, the visual representation is updated to include icons 510 representing devices associated with the selected access point.

Visualization 500 may also include a summary element 512 that can provide high level information regarding network devices in the site network.

FIG. 5B is a conceptual diagram of an example visualization of an organization's network topology graph at an organization level. Visualization 520 shows a hierarchy of network devices, where organization 522 is the root of the network topology graph. At a next level are icons representing two hubs in the network topology, including icon 524 representing a selected hub. At a next level are icons representing an aggregated count of sites connected to their respective hubs, including icon 526 connected to icon 524. Upon selection of icon 526, a list 530 of spoke sites connected to the hub via WAN or SD-WAN links represented by connections 528 may be presented in the visualization. Upon selection of an icon representing a site (icon 532 in this example), a next level in visualization 500 presents a list of switches at the site, including icon 534 representing a switch labeled "switch 5." Upon selection of icon 534, icons representing access points connected to "switch 5" may be presented in visualization 500, including icon 536 representing an access point labeled "access point 2." Upon selection of icon 536, a list 538 of wireless clients may be presented representing client devices connected to the selected access point.

In some aspects, information element 540 may be presented upon selection of an icon representing a switch. In the example illustrated in FIG. 5B, information element 540 shows information about the selected switch represented by icon 536 (e.g., "switch 5"). In some aspects, the information shown can include a Media Access Control (MAC) address, uptime, power draw, number of connected APs, number of connected WiFi clients, and number of connected wired clients.

FIGS. 5A and 5B have illustrated example visualizations of a network topology at a site level and organizational level. Visualizations for other levels may be generated from the network topology graph, for example, switch level, AP level etc.

Figure 6A:
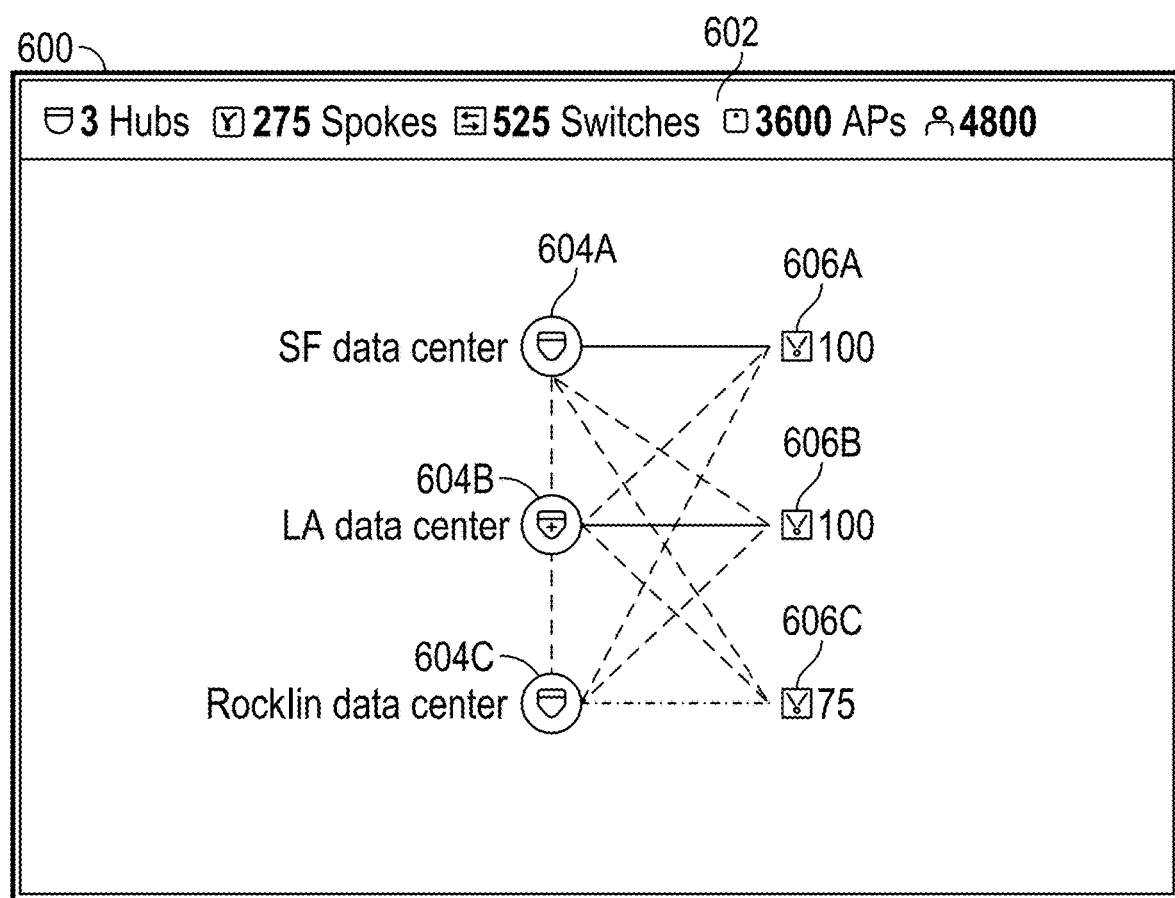
FIGS. 6A-6C are conceptual views of example user interfaces for presenting aspects of a network topology graph, in accordance with one or more techniques of the disclosure.
Figure 6B:
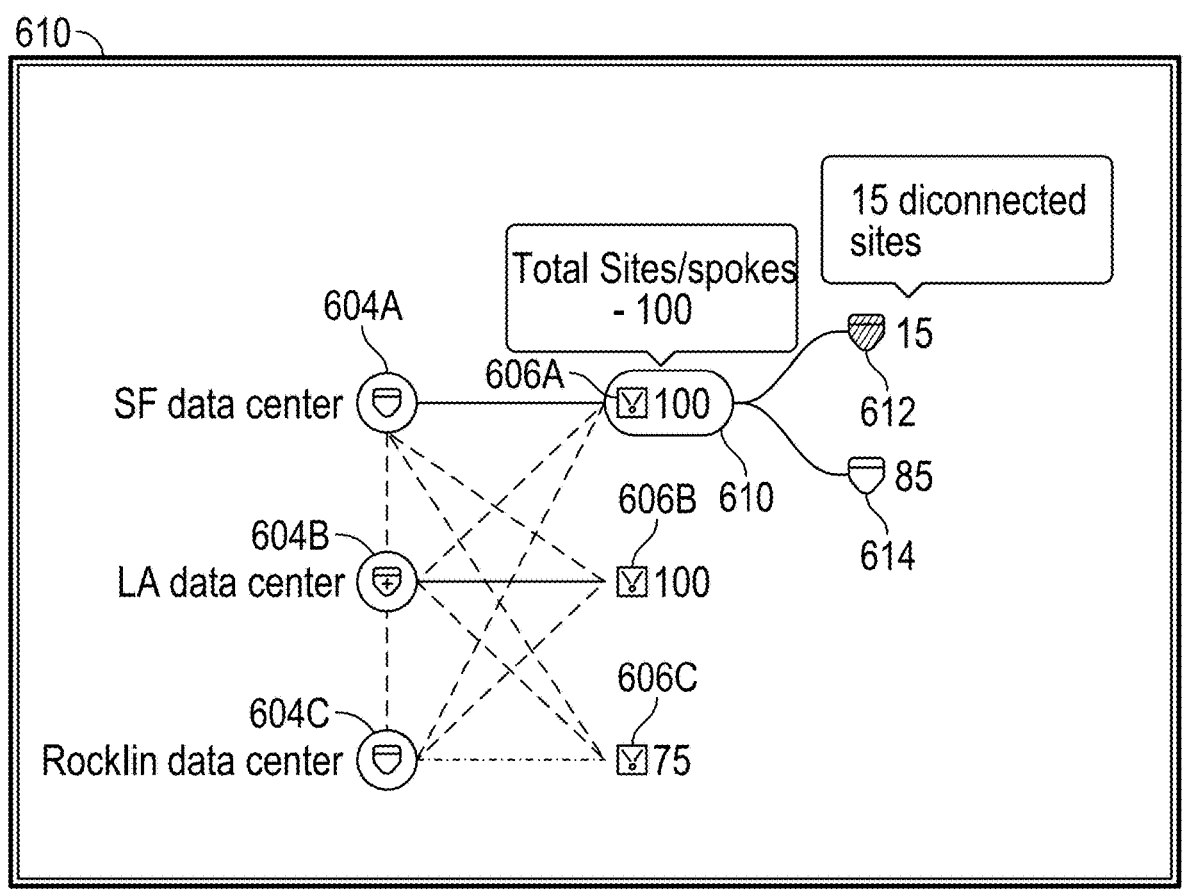
Figure 6C:
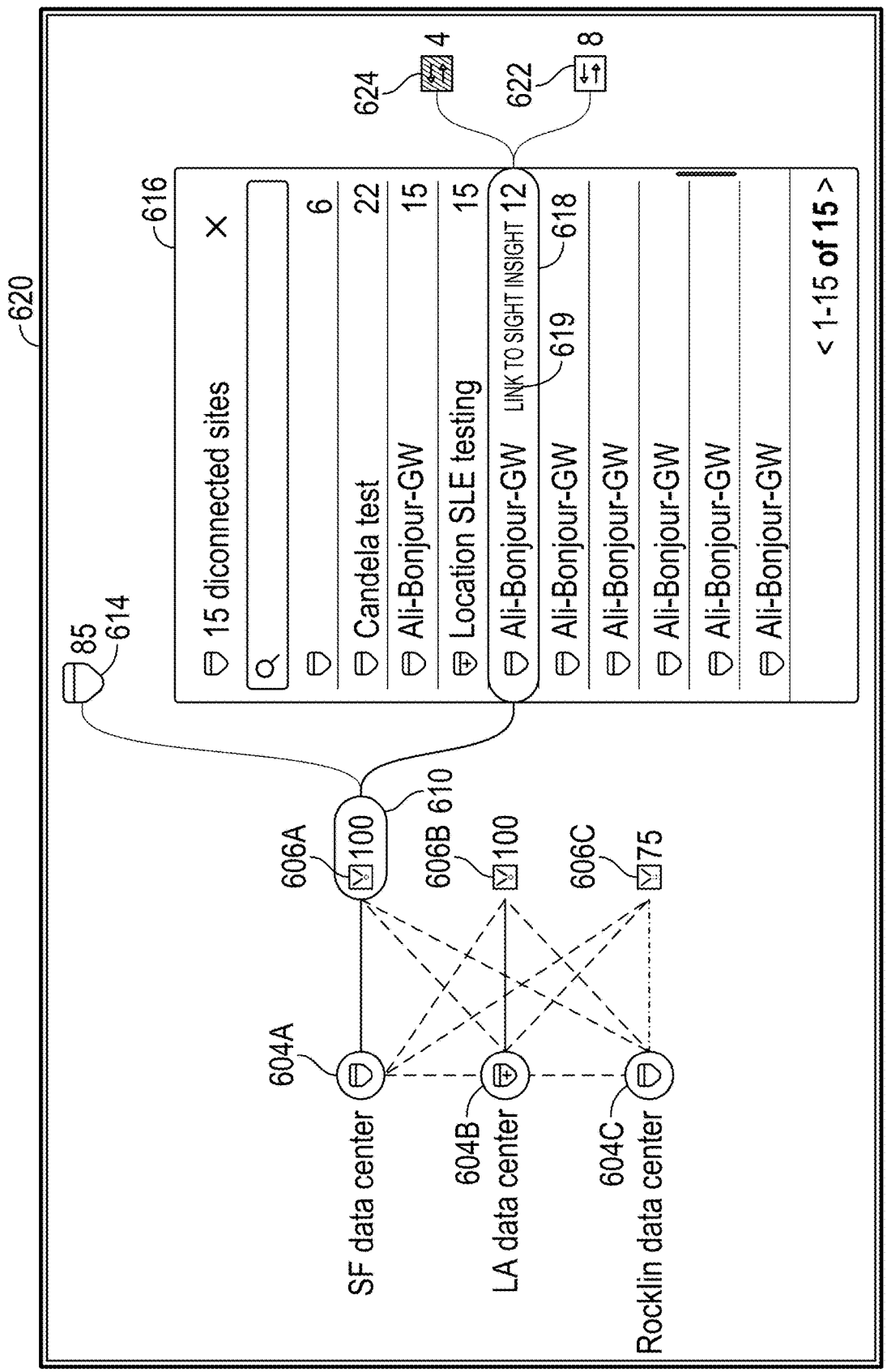

FIGS. 6A-6C are conceptual views of example user interfaces for presenting aspects of a network topology graph, in accordance with one or more techniques of the disclosure. NAS 150 may provide APIs that expose network topology 137 data from database cluster 152 to a user interface (UI) that can visualize some or all of an organization level topology based on an addresses (e.g., a MAC address) assigned to the organization's network or sites within the organization's network. The organization level topology UI may be an interactive and scalable UI. For example, instead of attempting to display all of the entities and connectivity in the full organization level topology, the UI may present only hubs, spokes, and mesh connectivity to represent the organization's network as shown in FIGS. 6A-6C an described below.

The example user interfaces shown in FIGS. 6A-6C illustrate, among other aspects, scalability aspects with respect to display of the network topology graph. FIG. 6A is a conceptual view of an initial screen 600 of a user interface, according to techniques of the disclosure. In some aspects, screen 600 can include a summary element 602 that provides information regarding the number of hubs, spokes, switches, APs and clients in the network topology. Screen 600 also can include icons 604A-604C representing hubs (e.g., data centers), and icons 606A-606C representing spoke/sites connected to the respective hubs. In some aspects, a number next to an icon 606 represents a count of the number of spoke/sites. For example, there are 100 spoke/sites connected to "SF data center" and "LA data center", and seventy-five spoke/sites connected to the "Rocklin data center."

FIG. 6B is a conceptual view of screen of a user interface showing further details regarding spokes/sites connected to a hub, according to techniques of the disclosure. As an example, screen 610 may be generated in response to selection of icon 606A. In the example illustrated in FIG. 6B, screen 610 presents an expanded (i.e., scaled up) view of the network topology when compared with screen 600. In particular, screen 610 includes an icon 612 representing disconnected sites and icon 614 representing connected sites. In this example, of the 100 spokes/sites associated with the SF data center, fifteen are disconnected sites (represented by icon 612) and eighty-five are connected sites (represented by icon 614).

FIG. 6C is a conceptual view of screen of a user interface showing further details regarding disconnected spokes/sites connected to a hub, according to techniques of the disclosure. As an example, screen 620 may be generated in response to selection of icon 612 of FIG. 6B. In the example illustrated in FIG. 6C, screen 620 presents a further expanded (i.e., scaled up) view of the network topology when compared with screens 600 and 610. In response to selection of icon 612 of FIG. 6B, a list 616 of disconnected sites is presented. The list can include the name of the site along with a count of the number of switches at the site. In the example illustrated in FIG. 6C, site "Ali-Bonjour" represented by UI element 618 has been selected. Upon such selection, icon 622 representing connected switches at the site and icon 624 representing disconnected switches at the site are generated and presented on screen 620. In some aspects, a site UI element such as element 618 may include a link 619. Upon selection of link 619, further details on the site represented by UI element 618 may be presented to the user.

Figure 7:
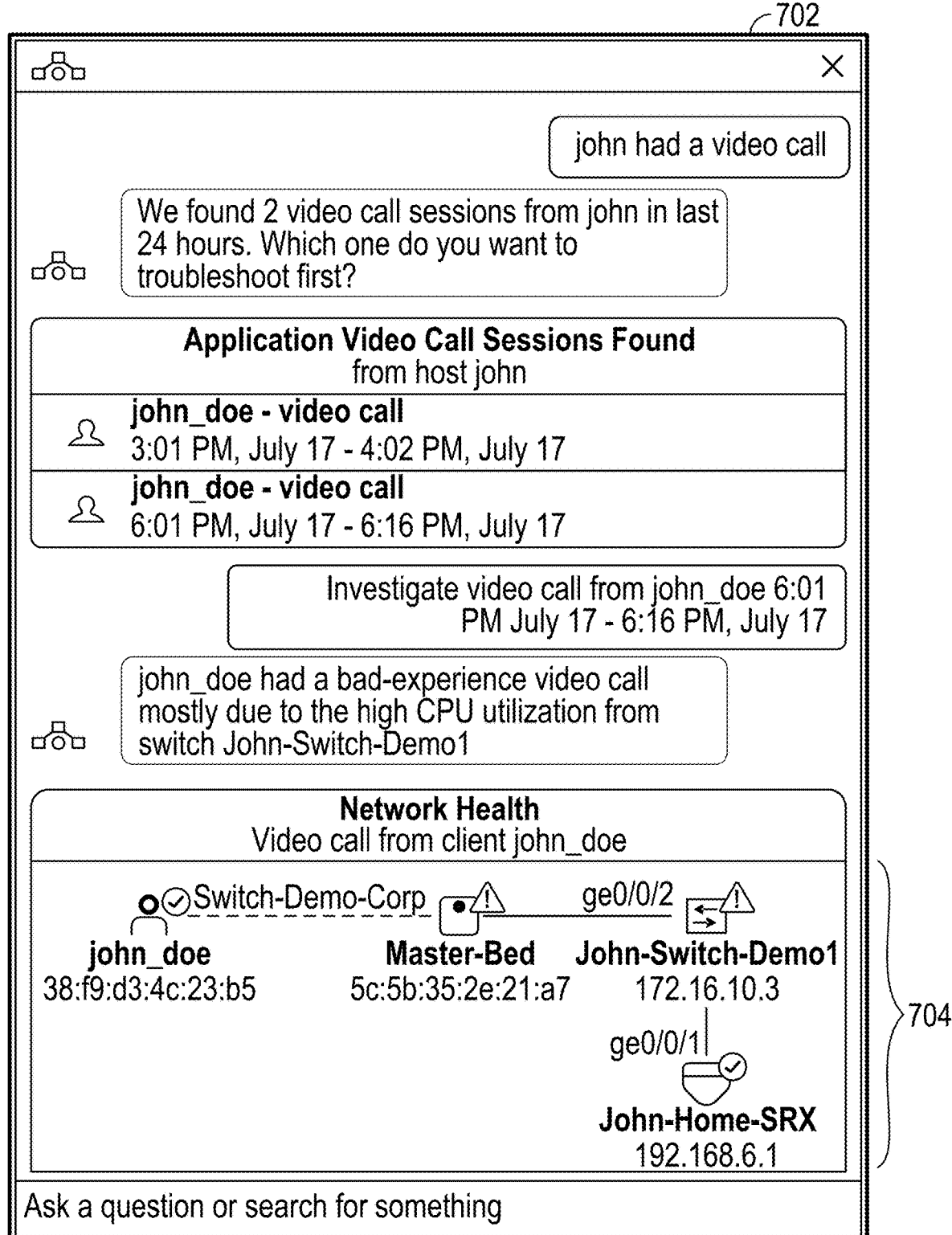
FIG. 7 is a conceptual view of a user interface for a troubleshooting application, in accordance with one or more techniques of the disclosure.

FIG. 7 is a conceptual view of a user interface for a troubleshooting application, in accordance with one or more techniques of the disclosure. In the example shown in FIG. 1, client 110A and client 110B are described as communicating with one another via application 114A and 114B. In the event that there are issues with the communications between applications 114A and 114B, a troubleshooting application (e.g., application 162 of FIG. 1) may be employed to determine a root cause of the issues. In the example illustrated in FIG. 7, applications 114A and 114B may be video calling applications, where one or both of the applications exhibited network performance issues that caused a poor user experience with respect to the video call. A trouble shooting application may display screen 702 after determining a root cause of the issues. In this example, the troubleshooting application is directed to investigate a video call in the past (e.g., July 17 from 6:01 pm-6:16 pm). The troubleshooting application can utilize the temporal network topology graph described above at FIG. 3 to determine the network connectivity at the time of the video call to be investigated. A portion of the network topology at the time of the video call may be displayed in portion 704 of screen 702 to assist the troubleshooter in locating the device that was the root cause of the issue.

Figure 8:
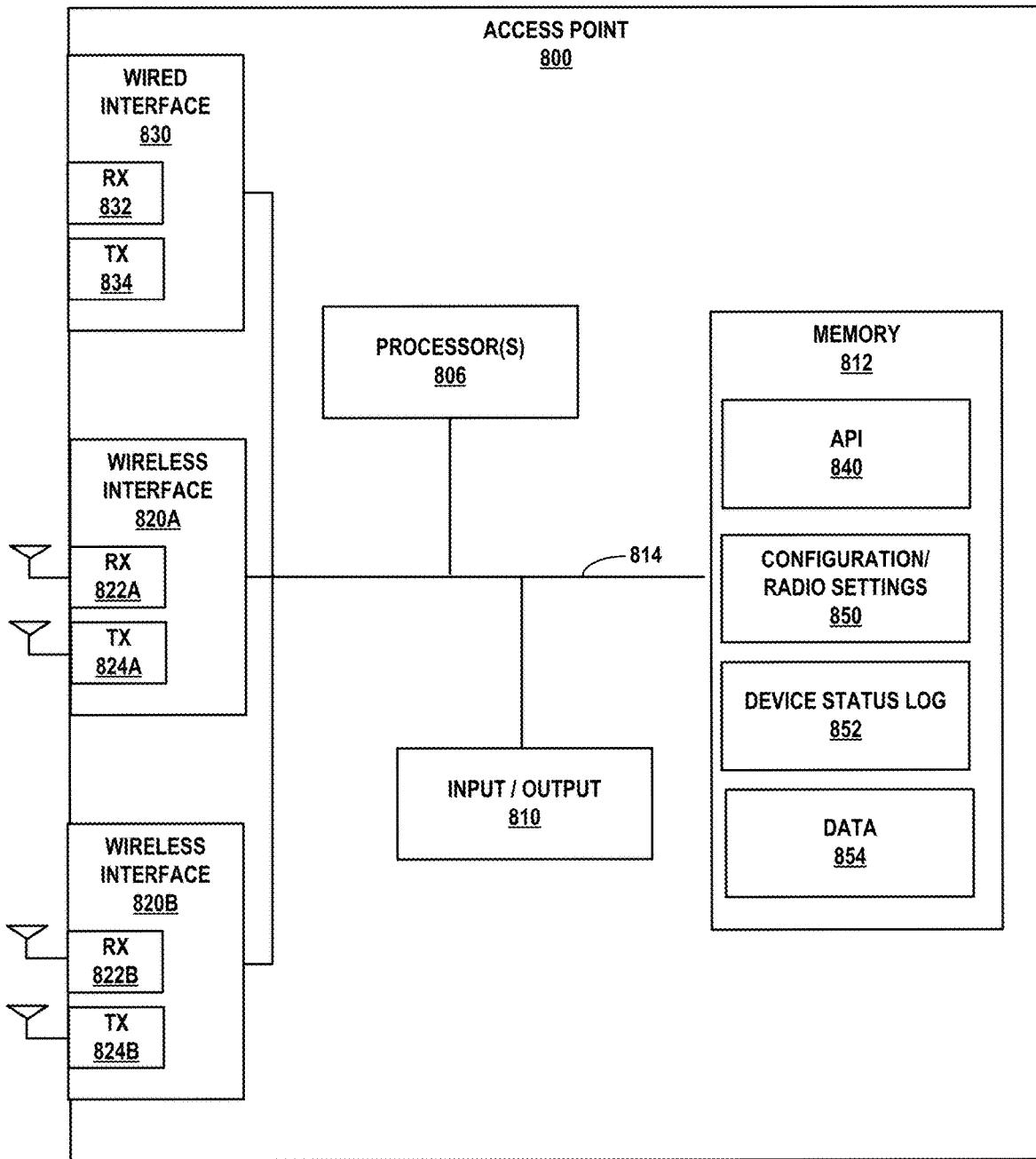
FIG. 8 is a block diagram of an example access point device, in accordance with one or more techniques of the disclosure.

FIG. 8 is a block diagram of an example access point device, in accordance with one or more techniques of the disclosure. Example access point 800 shown in FIG. 8 may be used to implement any of APs 106 as shown and described herein with respect to FIG. 1. Access point 800 may comprise, for example, a Wi-Fi, Bluetooth and/or Bluetooth Low Energy (BLE) base station or any other type of wireless access point.

In the example of FIG. 8, access point 800 includes a wired interface 830, wireless interfaces 820A-820B, one or more processor(s) 806, memory 812, and a user interface 810, coupled together via a bus 814 over which the various elements may exchange data and information. Wired interface 830 represents a physical network interface and includes a receiver 832 and a transmitter 834 for sending and receiving network communications, e.g., packets. Wired interface 830 couples, either directly or indirectly, access point 800 to switches 104 of FIG. 1. First and second wireless interfaces 820A and 820B represent wireless network interfaces and include receivers 822A and 822B, respectively, each including a receive antenna via which access point 800 may receive wireless signals from wireless communications devices, such as clients 110 of FIG. 1. First and second wireless interfaces 820A and 820B further include transmitters 824A and 824B, respectively, each including transmit antennas via which access point 800 may transmit wireless signals to wireless communications devices, such as clients 110 of FIG. 1. In some examples, first wireless interface 820A may include a Wi-Fi 802.11 interface (e.g., 8.4 GHz and/or 5 GHz) and second wireless interface 820B may include a Bluetooth interface and/or a Bluetooth Low Energy (BLE) interface. However, these are given for example purposes only, and the disclosure is not limited in this respect.

Processor(s) 806 are programmable hardware-based processors configured to execute software instructions, such as those used to define a software or computer program, stored to a computer-readable storage medium (such as memory 812), such as non-transitory computer-readable mediums including a storage device (e.g., a disk drive, or an optical drive) or a memory (such as Flash memory or RAM) or any other type of volatile or non-volatile memory, that stores instructions to cause the one or more processors 806 to perform one or more of the techniques described herein.

Memory 812 includes one or more devices configured to store programming modules and/or data associated with operation of access point 800. For example, memory 812 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 806 to perform one or more of the techniques described herein.

In this example, memory 812 stores executable software including an application programming interface (API) 840, configuration settings 850, a device status log 852 and data storage 854. Device status log 852 includes a list of network parameters and/or network events specific to access point 800. The network parameters may include, for example, any network parameter indicative of one or more aspects of performance of the wireless network. In some examples, network parameters may include a plurality of connection states for clients associated with access point 800.

Network events may include, for example, access point events and/or client events. The access point events and/or client events may each include a log of normal network events, neutral network events, and/or error network events. The network events may include, for example, memory status, reboot events, crash events, Ethernet port status, upgrade failure events, firmware upgrade events, configuration changes, authentication events, DNS events, DHCP events, connection events, roaming events, etc., as well as a time and date stamp for each event. Data 854 may store any data used and/or generated by access point 800, including data collected from clients 110 (FIG. 1) that is transmitted by access point 800 for cloud-based analysis of an organization's networks by NAS 150 (FIG. 1).

Input/output (I/O) 810 represents physical hardware components that enable interaction with a user, such as buttons, a touchscreen, a display and the like. Although not shown, memory 812 typically stores executable software for controlling a user interface with respect to input received via I/O 810.

As described herein, AP device 800 may measure and report network data (i.e., network parameters, network connectivity, and/or network event data) from status log 852 to NAS 150. The network data is indicative of one or more aspects of wireless network performance and/or status of the wireless network. AP device 800 can provide the network data to NAS 150 for use in the techniques described herein.

Figure 9:
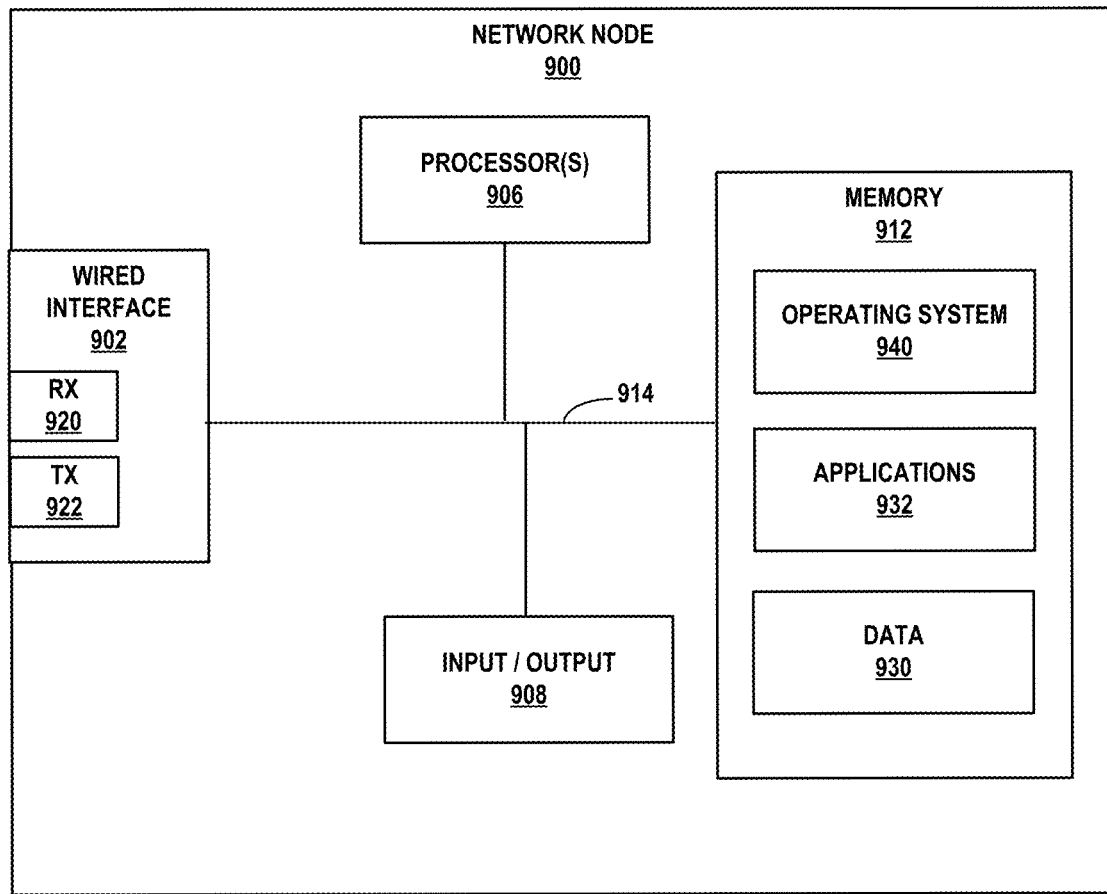
FIG. 9 is a block diagram of an example network node, such as a router or switch, in accordance with one or more techniques of the disclosure.

FIG. 9 is a block diagram illustrating an example network node 900 configured according to the techniques described herein. In one or more examples, the network node 900 implements a network device or a server attached to the network 134 of FIG. 1, e.g., routers 104, switches 106, server(s) implementing NAS 150, etc., or other network devices.

In this example, network node 900 includes a wired interface 902, e.g., an Ethernet interface, a processor 906, input/output 908, e.g., display, buttons, keyboard, keypad, touch screen, mouse, etc., and a memory 912 coupled together via a bus 914 over which the various elements may interchange data and information. Wired interface 902 couples the network node 900 to a network, such as an organization network. Though only one interface is shown by way of example, those skilled in the art should recognize that network nodes may, and usually do, have multiple communication interfaces and/or multiple communication interface ports. Wired interface 902 includes a receiver 920 and a transmitter 922.

Memory 912 stores executable software applications 932, operating system 940 and data/information 930. Data 930 may include a system log and/or an error log that stores event data, including behavior data, for network node 900. In examples where network node 900 comprises a "third-party" network device, the same entity does not own or have access to both the APs or wired client-side devices and network node 900. As such, in the example where network node 900 is a third-party network device, NAS 150 may not receive, collect, or otherwise have access to the network data from network node 900.

In examples where network node 900 comprises a server, network node 900 may receive data and information, e.g., including telemetry data 130, operation related information, e.g., registration request, AAA services, DHCP requests, Simple Notification Service (SNS) look-ups, and Web page requests via receiver 920, and send data and information, e.g., including configuration information, authentication information, web page data, etc. via transmitter 922.

In examples where network node 900 comprises a wired network device, network node 900 may be connected via wired interface 902 to one or more APs or other wired client-side devices, e.g., IoT devices, within a wired network edge. For example, network node 900 may include multiple wired interfaces 902 and/or wired interface 902 may include multiple physical ports to connect to multiple APs or the other wired-client-side devices within a site via respective Ethernet cables. In some examples, each of the APs or other wired client-side devices connected to network node 900 may access the wired network via wired interface 902 of network node 900. In some examples, one or more of the APs or other wired client-side devices connected to network node 900 may each draw power from network node 900 via the respective Ethernet cable and a Power over Ethernet (PoE) port of wired interface 902.

In examples where network node 900 comprises a session-based router that employs a stateful, session-based routing scheme, network node 900 may be configured to independently perform path selection and traffic engineering. The use of session-based routing may enable network node 900 to eschew the use of a centralized controller, such as an SDN controller, to perform path selection and traffic engineering, and eschew the use of tunnels. In some examples, network node 900 may implement session-based routing as Secure Vector Routing (SVR), provided by Juniper Networks, Inc. In the case where network node 900 comprises a session-based router operating as a network gateway for a site of an organization network (e.g., routers 108 of FIG. 1), network node 900 may establish multiple peer paths (e.g., logical path 189 of FIG. 1B) over an underlying physical WAN (e.g., an SD-WAN) with one or more other session-based routers operating as network gateways for other sites (e.g., sites 102 of FIG. 1) of the organization network. Network node 900, operating as a session-based router, may collect data at a peer path level, and report the peer path data to NAS 150.

In examples where network node 900 comprises a packet-based router, network node 900 may employ a packet- or flow-based routing scheme to forward packets according to defined network paths, e.g., established by a centralized controller that performs path selection and traffic engineering. In the case where network node 900 comprises a packet-based router operating as a network gateway for a site of an organization network (e.g., routers 108 of FIG. 1), network node 900 may establish multiple tunnels over an underlying physical WAN with one or more other packet-based routers operating as network gateways for other sites 102 of the organization network (e.g., via a router 108 of the site 102). Network node 900, operating as a packet-based router, may collect data at a tunnel level, and the tunnel data may be reported to NAS 150 via an API or an open configuration protocol.

The data collected and reported by network node 900 may include periodically-reported data and event-driven data. Network node 900 can be configured to collect logical path statistics via bidirectional forwarding detection (BFD) probing and data extracted from messages and/or counters at the logical path (e.g., peer path or tunnel) level. In some examples, network node 900 is configured to collect statistics and/or sample other data according to a first periodic interval, e.g., every 3 seconds, every 9 seconds, etc. Network node 900 may store the collected and sampled data as path data, e.g., in a buffer. In some examples, network node 900 may periodically create a package of the statistical data according to a second periodic interval, e.g., every 3 minutes. In some examples, the package of statistical data may also include details about clients connected to network node 900 and the associated client sessions. Network node 900 may then report the package of statistical data to NAS 150 in the cloud. In other examples, NAS 150 may request, retrieve, or otherwise receive the package of statistical data from network node 900 via an API, an open configuration protocol, or another of communication protocols. The package of statistical data created by network node 900 or another module of network node 900 may include a header identifying network node 900 and the statistics and data samples for each of the logical paths from network node 900. In still other examples, network node 900 reports event data to NMS 130 in the cloud in response to the occurrence of certain events at network node 900 as the events happen.

Figure 10:
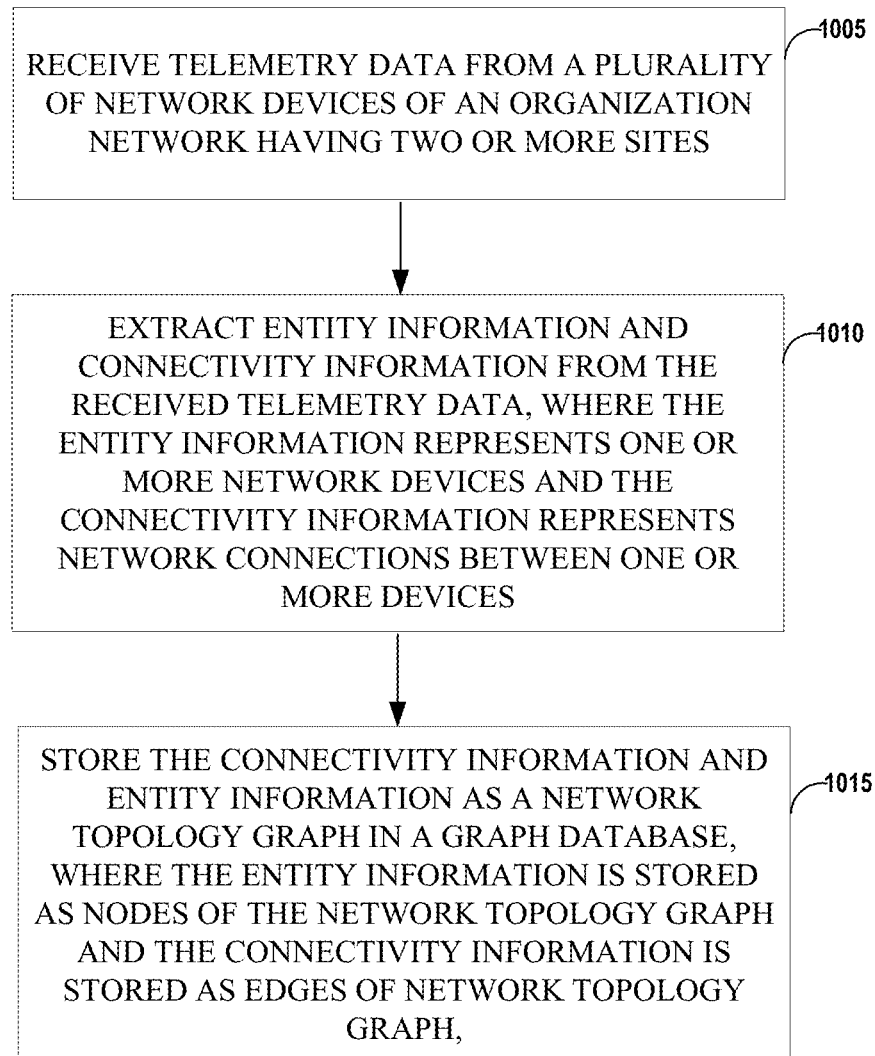
FIG. 10 is a flowchart illustrating operations for a network analysis system, according to one or more techniques of the disclosure.

FIG. 10 is a flowchart illustrating operations for a network analysis system, in accordance with one or more techniques of this disclosure. A NAS may receive telemetry data from a plurality of network devices, the plurality of network devices comprising an organization network having two or more sites, the plurality of network devices configured to provide at least one wireless network at each site (1005). Next, a NAS may extract entity information and connectivity information from the received telemetry data, wherein the entity information represents one or more network devices of the plurality of network devices and the connectivity information represents network connections between one or more devices of the plurality of network devices (1010). Next, a NAS may store the connectivity information and entity information as a network topology graph in a graph database, wherein the entity information is stored as nodes of the network topology graph and the connectivity information is stored as edges of network topology graph, and wherein the network topology graph represents an organization level topology of the organization network (1015).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network analysis system comprising:
a memory storing telemetry data received from a plurality of network devices, the plurality of network devices comprising an organization network having two or more sites, the plurality of network devices configured to provide at least one wireless network at each site of the two or more sites; and
one or more processors coupled to the memory and configured to:
extract entity information and connectivity information from the stored telemetry data, wherein the entity information represents one or more network devices of the plurality of network devices and the connectivity information represents one or more network connections between one or more network devices of the plurality of network devices;
analyze the entity information and the connectivity information to identify one or more third-party network devices within the organization network, wherein a third-party network device is a network device that does not provide telemetry data or that does not provide telemetry data according to a protocol known to the system; and
store the connectivity information and entity information as a network topology graph in a graph database, wherein the entity information is stored as nodes of the network topology graph and the connectivity information is stored as edges of the network topology graph, and wherein the network topology graph represents an organization level topology of the organization network.

2. The system of claim 1, wherein the network topology graph includes edges representing current connectivity and edges representing past connectivity.

3. The system of claim 1, wherein the one or more processors are configured to analyze the entity information and the connectivity information to determine hierarchy information of the two or more sites within the organization network, wherein the hierarchy information identifies each site as either a hub or a spoke.

4. The system of claim 3, wherein the one or more processors are configured to identify an uplink port for a network device, and in response to identifying the uplink port, identify a switch as a spoke switch.

5. The system of claim 1, wherein the one or more processors are configured to generate data representative of a user interface including a visualization of the organization level topology for presentation on an administrator device, wherein the user interface presents a scalable representation of the organization level topology.

6. The system of claim 1, wherein the connectivity information represents wireless, wired, and logical connectivity, the logical connectivity representing peer paths and Internet Protocol Security (IPsec) tunnels.

7. The system of claim 1, wherein the entity information represents client devices, access points (APs), switches, gateways, third-party network devices, and applications running on the client devices, wherein a third-party network device is a network device that does not provide telemetry data or that does not provide telemetry data according to a protocol known to the system.

8. The system of claim 7, wherein the telemetry data includes session flow data, and wherein the one or more processors are configured to determine the applications running on the client devices based on the session flow data.

9. The system of claim 1, wherein the telemetry data includes uplink data in Link Layer Discovery Protocol (LLDP) advertisements, logical link data that includes peer path data and IPsec tunnel data.

10. A method comprising:
receiving, by one or more processors of a system, telemetry data from a plurality of network devices, the plurality of network devices comprising an organization network having two or more sites, the plurality of network devices configured to provide at least one wireless network at each site;
extracting, by the one or more processors, entity information and connectivity information from the telemetry data, wherein the entity information represents one or more network devices of the plurality of network devices and the connectivity information represents one or more network connections between one or more devices of the plurality of network devices;
analyzing the entity information and the connectivity information to identify one or more third-party network devices within the organization network, wherein a third-party network device is a network device that does not provide telemetry data or that does not provide telemetry data according to a protocol known to the system; and
storing, by the one or more processors, the connectivity information and entity information as a network topology graph in a graph database, wherein the entity information is stored as nodes of the network topology graph and the connectivity information is stored as edges of the network topology graph, and wherein the network topology graph represents an organization level topology of the organization network.

11. The method of claim 10, wherein the network topology graph includes edges representing current connectivity and edges representing past connectivity.

12. The method of claim 10, further comprising analyzing the entity information and the connectivity information to determine hierarchy information of the two or more sites within the organization network, wherein the hierarchy information identifies each site as either a hub or a spoke.

13. The method of claim 10, further comprising:
identifying a port of a network device as an uplink port for the network device; and
in response to identifying the uplink port, identifying the network device as a spoke device.

14. The method of claim 10, further comprising:
generating data representative of a user interface including a visualization of the organization level topology, wherein the user interface presents a scalable representation of the organization level topology; and
presenting the user interface on a display of an administrator device.

15. The method of claim 10, wherein the connectivity information represents wireless, wired, and logical connectivity, the logical connectivity representing peer paths and IPsec tunnels.

16. A non-transitory, computer-readable medium having instructions stored thereon that when executed, cause one or more processors of a system to:

receive telemetry data from a plurality of network devices, the plurality of network devices comprising an organization network having two or more sites, the plurality of network devices configured to provide at least one wireless network at each site;

extract entity information and connectivity information from the received telemetry data, wherein the entity information represents one or more network devices of the plurality of network devices and the connectivity information represents one or more network connections between one or more devices of the plurality of network devices;

analyze the entity information and the connectivity information to identify one or more third-party network devices within the organization network, wherein a third-party network device is a network device that does not provide telemetry data or that does not provide telemetry data according to a protocol known to the system; and store the connectivity information and entity information as a network topology graph in a graph database, wherein the entity information is stored as nodes of the network topology graph and the connectivity information is stored as edges of the network topology graph, and wherein the network topology graph represents an organization level topology of the organization network.

17. The non-transitory, computer-readable medium of claim 16, wherein the network topology graph includes edges representing current connectivity and edges representing past connectivity.

* * * * *